Dec. 23, 1930.  C. G. WOODMANSEE  1,786,184
INCLINOMETER
Filed May 15, 1929    4 Sheets-Sheet 1
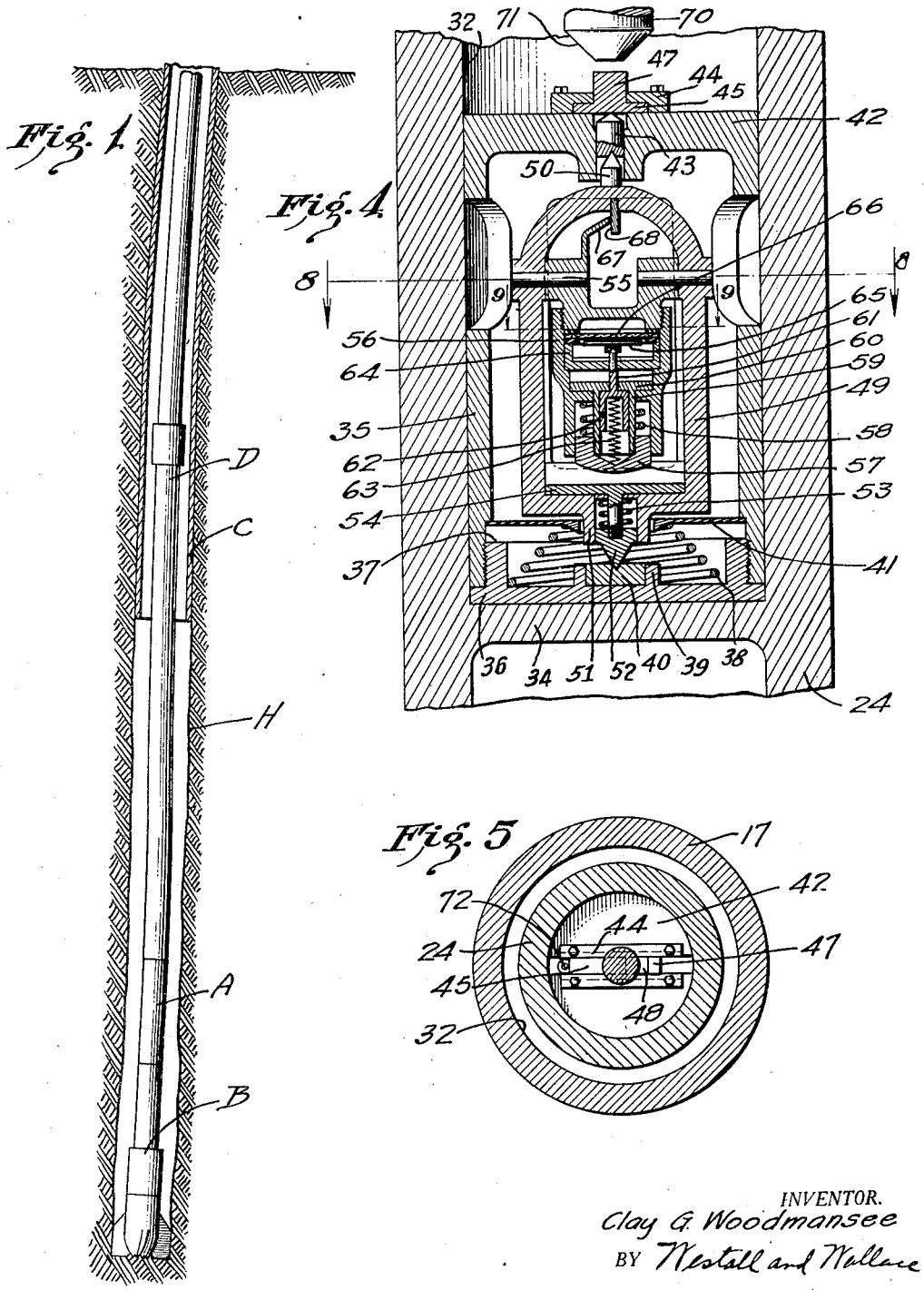
INVENTOR.
Clay G. Woodmansee
BY Westall and Wallace
ATTORNEYS.

Dec. 23, 1930.  C. G. WOODMANSEE  1,786,184
INCLINOMETER
Filed May 15, 1929  4 Sheets-Sheet 2
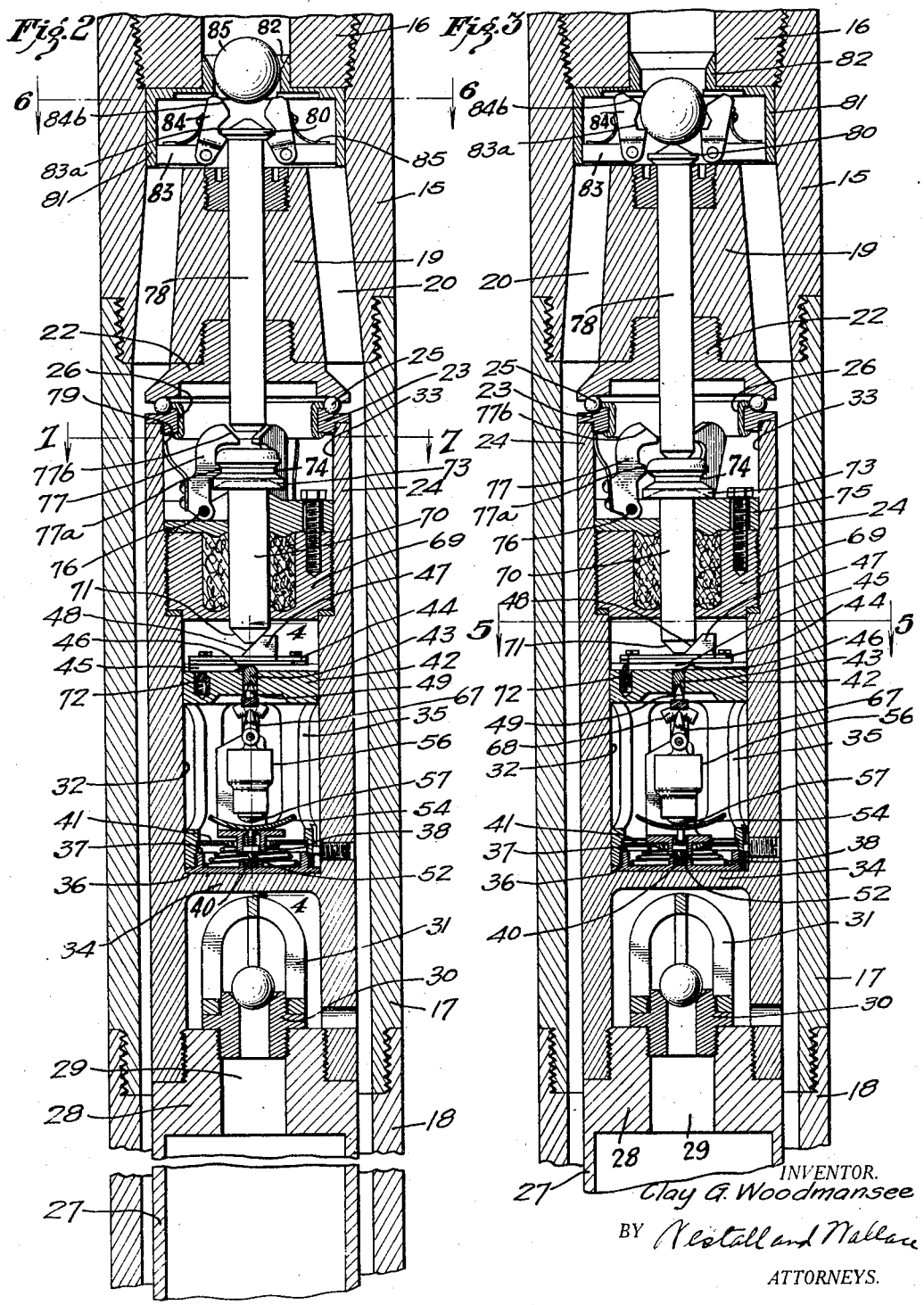
INVENTOR.
Clay G. Woodmansee
BY Nestall and Wallace
ATTORNEYS.

Dec. 23, 1930.   C. G. WOODMANSEE   1,786,184
INCLINOMETER
Filed May 15, 1929    4 Sheets-Sheet 3

INVENTOR.
Clay G. Woodmansee
BY
ATTORNEYS.

Dec. 23, 1930.      C. G. WOODMANSEE      1,786,184
INCLINOMETER
Filed May 15, 1929      4 Sheets-Sheet 4
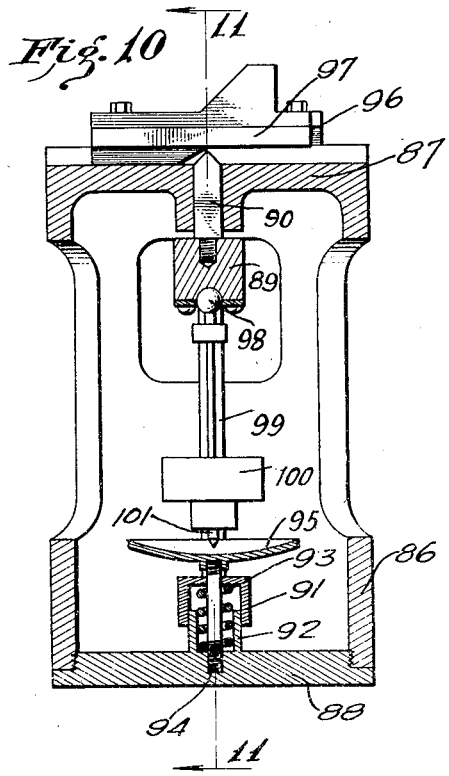
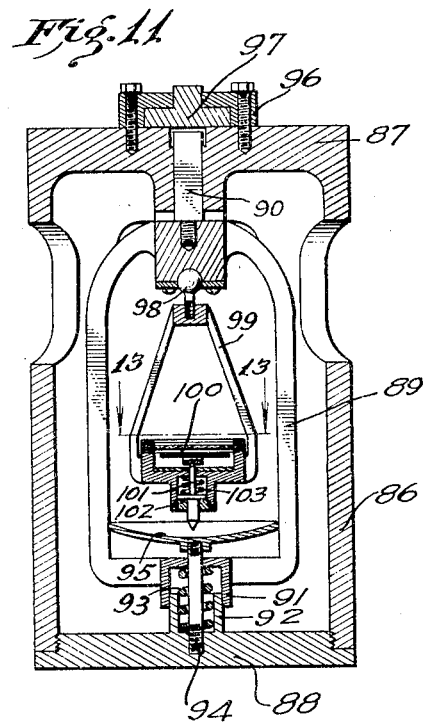
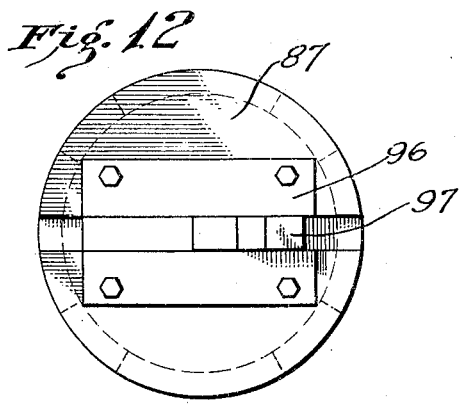
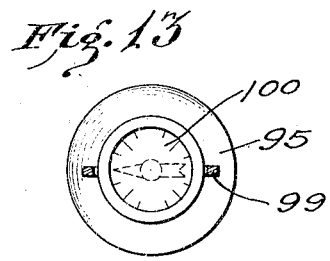
INVENTOR.
Clay G. Woodmansee
BY Nestall and Nallace
ATTORNEYS.

Patented Dec. 23, 1930

1,786,184

UNITED STATES PATENT OFFICE

CLAY G. WOODMANSEE, OF LOS ANGELES, CALIFORNIA, ASSIGNOR OF ONE-HALF TO LINCOLN DRILLING COMPANY, OF LOS ANGELES, CALIFORNIA, A CORPORATION OF CALIFORNIA

INCLINOMETER

Application filed May 15, 1929. Serial No. 363,134.

This invention relates to an instrument for recording the orientation and inclination of holes, and is adaptable among other things to recording the orientation and inclination of specimens captured from earth formations.

In deep drilling, it happens frequently that the axis of the hole is not maintained straight. Exploration of the hole is desirable to determine the direction. This is especially desirable when samples of the formation are taken to determine the nature of the formation, the dip and direction of dip of any strata.

The present invention has for its objects the provision of an instrument which may be operated to record the inclination and orientation of the hole at any desired point therein. Another object of this invention is to provide certain details of structure contributing to simplicity and certainty of operation.

As illustrative of the present invention, two devices are shown in the accompanying drawings, in which:—

Figure 6:
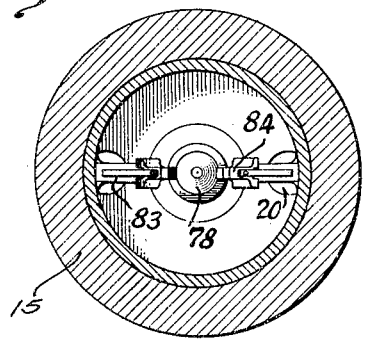
Figure 7:
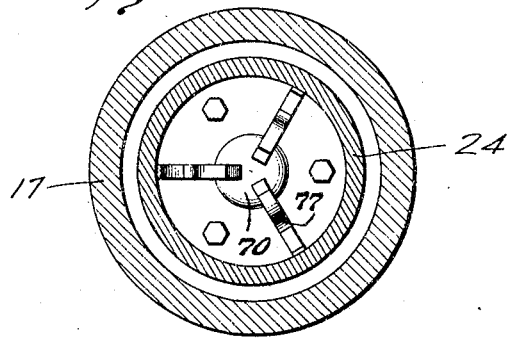
Figure 8:
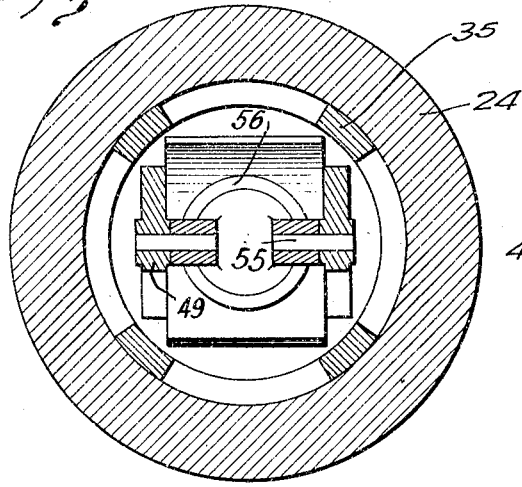
Figure 9:
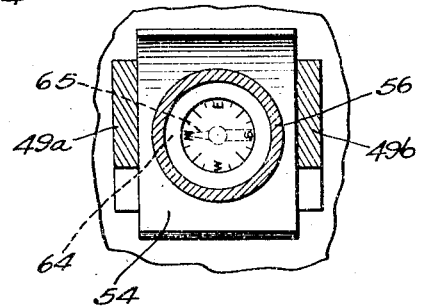

Fig. 1 shows a fragment of a well hole having a drill pipe string and a core drill with an instrument embodying my invention inserted in the drill string; Fig. 2 is a longitudinal section through a fragment of one form of an instrument embodying my invention and with the operative parts in non-indicating position; Fig. 3 is a view similar to Fig. 2 showing the operative parts in indicating position; Fig. 4 is a longitudinal sectional view on an enlarged scale taken at right angles to Figs. 2 and 3 showing details of the indicating parts; Fig. 5 is a section as seen on the line 5—5 of Fig. 3; Figs. 6 and 7 are sections as seen on the lines correspondingly numbered in Fig. 2; Figs. 8 and 9 are sections as seen on the lines correspondingly numbered in Fig. 4; Fig. 10 is a longitudinal section through an indicating cage and its parts embodying my invention in another form; Fig. 11 is a section as seen on the line 11—11 of Fig. 10; Fig. 12 is a plan view of the structure shown in Fig. 10; and Fig. 13 is a section as seen on the line 13—13 of Fig. 11.

Referring more particularly to Fig. 1, H indicates a well hole having a casing C therein. It will be noted that the well hole is not straight. Within the well hole is a drill pipe string marked D. A core barrel and bit is denoted by B. Intermediate the drill pipe and the core bit is my improved instrument A.

Referring more particularly to Figs. 2 to 9 inclusive, a coupling member is indicated by 15. This member is in general of the type used as the box portion of tool joints. The pin end of such a joint is indicated by 16 and is a part of the drill pipe string D shown in Fig. 1. Member 15 is reduced in external diameter to receive a tubular section 17 to which the outer barrel member 18 of a core drill may be connected. The members 15 and 17 form a housing for parts of the recording instrument. Box member 15 has a head 19 with circulation passages 20 extending therethrough. A central bore extends therethrough to receive a pin. A plug serving as a portion of a ball race is marked 22 and is secured in a counter bore in head 19. Cooperating with the race member 22 is a race member 23 secured to a tubular shell 24. Intermediate members 22 and 23 are balls 25, there being a suitable spacer 26 to provide a ball bearing connection between the head and the shell. Secured to the lower end of the shell 24 is the inner barrel 27 of the core barrel. The inner barrel has a head 28 with a bore 29, in which is mounted a ball seat 30 of a ball valve structure indicated generally by 31. It will be understood that the specific core drill structure forms no part of the present invention.

The shell 24 has a bore 32 enlarged in diameter at its upper end as indicated by 33. This bore is provided with an internal thread for reception of a plug. An abutment partition 34 provides a seat for a cage structure. Disposed within bore 32 and resting upon the partition wall 34 is a cage 35 including a lower head 36. The head 36 is provided with an annular extension externally threaded so that the head may be screwed into the cage and provide a shoulder 37 and has a recess to receive a compression spring 38. At the center of head 36 is a cupped boss 39, see Fig. 4, in which is mounted a bearing 40. Resting upon the spring 38 is a brake disk 41 movable between the shoulder 37 and a shoulder formed upon the cage 35. The cage 35 has an upper head 42. At the center of the head 42 is an opening to receive a slidable bearing member 43 in the form of a cylindrical plug. Extending in a diametrical direction across the head and secured thereto is a channelled guide 44 serving as a slide way for a latch 45. An inclined step 46 is provided upon the lower face of the latch and is so disposed that when the latch is in one position as shown in Fig. 2, the bearing plug 43 clears the inclined rise 46, and, when the latch is in the position as shown in Fig. 3, the plug rests against the lower surface of the latch step. Projecting upwardly from the latch is a push back member 47 having an inclined riser surface 48. Supported upon trunnions between bearings 40 and 43 is a supporting frame 49 having a fixed trunnion 50 to engage bearing 43. A socket extension 51 is provided on the lower portion of the frame to receive a slidable trunnion 52 held in outer position by a compression spring 53. Connected to trunnion 51 is a stem slidably extending through the cage and provided with an abutment saddle 54 curved in one direction.

Suspended upon pintles 55 within the frame is a pendulous hollow body 56. A socket is provided at the lower end of the hollow body 56 and slidably receives a cap 57. A compression spring 58 tends to hold the cap in projected position. The cap is recessed and secured therein is a hollow stem 59 having a head 60 disposed above the end wall of the socket. A bore is provided through the head 60 to accommodate a compass locking pin 61 having a socketed head 62 slidably disposed in stem 59. A compression spring 63 acts between cap 57 and head 62 tending to hold the head at the bottom of its socket 62. Resting on a ledge within the bore of housing 56 is a magnetic compass 64 provided with a needle 65. The needle has a bearing which rests upon the locking post 61 and is so arranged that when the post is moved into an uppermost position, the needle will rest against the glass cover 66 of the compass and be held in its oriented position. It will be noted that the frame has wings extending longitudinally, as best shown in Fig. 9. These wings, indicated by reference numerals 49a and 49b are offset from the axis of pintles 55 so that when the frame is tilted to one side, it will be gravitatively turned with the center of the overweighted side toward the lowest point, the axis of the pintles 55 being disposed at right angles to the direction of dip of the cage, so that the pendulous body may swing and maintain itself in vertical position. On the upper portion of the pendulous body is an indicator finger 67 cooperating with a scale 68 fixed to the crown of cage 49. The scale 68 may have divisional marks so that the pointer 67 will indicate thereon the angularity of the body with respect to the cage.

The bore of the shell 24 has a shoulder above the cage and is threaded to receive a plug 69. A packing is provided in the plug and a bore to slidably receive a bolt pin 70. The lower end of the bolt is tapered with an inclination corresponding to the inclination of the riser 48 on the slide latch. The parts are so arranged that when the bolt is in the upper position as shown in Fig. 2, the slide latch is in its left hand position with the inclined rise 46 clearing the end of bearing plug 43. When the pin is in its lower position as shown in Fig. 3, the slide latch will have been moved to the right causing the lower face of the step on the latch to engage the bearing plug 43 and move the latter into its lower position. To hold the slide latch in its right hand position, a detent pin 72 is provided on the head 42 of the frame. Bolt 70 has a head 73 provided with a peripheral gripping recess 74. Secured to the plug 69 by screws is a disk 75. The disk has recesses, which recesses are spanned by pins 76 pivotally carrying catches 77. The catches have projections 77a adapted to be engaged in the peripheral gripping recess 74 and has hooked ends to overlie the head 73 of the bolt. The upper ends of the hooks have inclined faces 77b for intrusion therebetween of an actuating pin.

Slidably extending through the head 19 is an actuating pin 78, the lower end of which has a bevelled edge to cooperate with the inclined ends of hooks 77b and spread the latter when the actuating pin is in the position shown in Fig. 3. Leaf springs 79 are mounted on the catches and tend to hold the latter in collapsed position as shown in Fig. 2. The head of pin 78 is provided with a knob 80 adapted to be engaged by catches. Disposed on head 19 and clamped between it and the pin end 16 is a ball receptor member 80 having a ball barrel 82 adapted to fit within the bore of the pin end 16. Secured within the bore of the ball barrel member are ears 83 to which are pivotally secured catches 84. The catches have leaf springs 85 bearing upon the ears and tending to hold the catches in their inner position as shown in Fig. 2. Notches are provided in the opposing faces of the catches to receive the extending rim of knob 80. The upper inner ends of the catches are bevelled as indicated by 84b. A ball 85 is shown disposed so that it may operate through the barrel 82, engage the latches 84 and spread the latter as shown in Fig. 3.

The instrument just described is operated by placing the parts in the position shown in Fig. 2. In this position the pendulous body and cage are free to rotate and swing respectively and the parts are in non-indicating position. Circulation may be maintained through the passages 20 around the shell 24 and into the core drill. The ball 85 at such time is not disposed in the circulation line. When the instrument has been positioned at the point at which it is desired to record the inclination and orientation of the hole, the ball 85 is dropped into the circulation passage of the drill pipe. It gravitates to the position shown in Fig. 2. Thereupon, the circulation pressure shoots the ball through barrel 82, spreading the catches 84 to release actuating pins 78. The ball strikes the head of the pin 78 and forces the latter downwardly. Thereupon the ball may roll to one side. Pin 78 being forced downwardly spreads catches 77 and releases bolt 70, forcing the latter downwardly to the position shown in Fig. 3. The tapered end of bolt 70 moves the side latch 47 to the right, forcing the bearing plug 43 downwardly carrying with it the supporting and pendulous body, causing the cap 57 of the pendulous body to abut the saddle 54 and thereby hold the pendulous body in indicating position. Engagement of the pendulous body with the saddle will cause the latter to be moved downwardly, the lower head of the frame engaging the brake disk 41 and maintaining the cage in its angular position. Engagement of the cap 57 with the saddle will cause movement upwardly of the compass locking pin 61 and retention of the compass needle 65 in position. The detent 72 prevents the slide latch from being displaced and all of the parts are held in indicating position as shown in Fig. 3. The instrument may then be elevated from the hole and removed, readings being taken which correctly indicate the inclination and orientation of the hole.

Referring more particularly to the structures shown in Figs. 10 to 13 inclusive, a shell 86 has an upper head 87 and a lower head 88. Mounted in the shell so as to be rotatable is a supporting frame 89. The frame is slidably supported upon a pin 90 at the upper end passing through a bore in the head and upon a socket 91 engaging a socketed extension 92 on head 88. A compression spring 93 tends to hold the cage in upper position and permit limited downward movement. Connected to the head and extending through the socket is a post 94 having a saddle 95 fixed to the upper end thereof and disposed within the frame. This saddle is dished. Mounted upon head 87 are slide ways 96 carrying a slide latch 97 of the same construction as before described and designed to be operated by a bolt so as to force the pin 90 downwardly. The pin 90 has a bevelled end which may be engaged by the step on the latch. A ball and socket connection 98 supports a pendulous body 99 carrying a compass 100 with a needle supported upon a bearing pin 101. The bearing pin has a spring seat 102 against which bears a compression spring 103 tending to hold the bearing pin in its lower pin with the needle of the compass free. The bearing pin is extended through the bottom of the socket and is pointed, being disposed in such position that when the cage is moved downwardly, the lower end of the bearing pin will engage the saddle and clamp the pendulous body in indicating position as well as moving the pin upwardly to lock the needle of the compass 100 in indicating position. The shell shown is substituted for the shell shown in Figs. 2 and 3 and is operated by similar bolt actuating pin, catches and a ball.

Various other modifications may be resorted to without departing from my invention.

What I claim is:—

1. An instrument for determining the direction of holes, comprising a cage, a compass having a normally free needle to indicate orientation, locking means to hold said needle in position, a supporting frame mounted for longitudinal movement in said cage, an elongated pendulous body supported in said supporting frame and normally free at one end, an abutment in said cage for the free end of said body and arranged to be normally free of and to be engaged by the free end of said body upon movement of said supporting frame to engagement of said body with said abutment and thereby to hold said pendulous body in indicating position, and a connection between said abutment and said locking means to actuate the latter and to hold said needle in indicating position when said supporting frame is held in indicating position.

2. An instrument for determining the direction of holes, comprising a cage, a compass having a normally free needle to indicate orientation, locking means to hold said needle in position, a supporting frame mounted for limited longitudinal travel in said cage, resilient means tending to hold said frame at one end of its travel, an elongated pendulous body supported in said supporting frame and normally free at one end, an abutment in said cage for the free end of said body and arranged to be normally free of and to be engaged by the free end of said body upon movement of said supporting frame to the other end of its travel and engagement of said body with said abutment and thereby to hold said pendulous body in indicating position, a connection between said abutment and said locking means to actuate the latter and to hold said needle in indicating position when said supporting frame is held in indicating position; mechanism for moving said frame to the other end of its travel including a laterally slidable latch on said cage, having an inclined riser, a bolt member engaged by said latch and movable by said riser to transmit longitudinal movement to said supporting frame and move said supporting frame to said other end of its travel.

3. An instrument for determining the direction of holes, comprising a cage, a compass having a normally free needle to indicate orientation, locking means to hold said needle in position, a supporting frame mounted for limited longitudinal travel in said cage, resilient means tending to hold said frame at one end of its travel, an elongated pendulous body supported in said supporting frame and normally free at one end, an abutment in said cage for the free end of said body and arranged to be normally free of and to be engaged by the free end of said body upon movement of said supporting frame to the other end of its travel and engagement of said body with said abutment and thereby to hold said pendulous body in indicating position, a connection between said abutment and said locking means to actuate the latter and to hold said needle in indicating position when said supporting frame is held in indicating position; mechanism for moving said frame to the other end of its travel including a laterally slidable latch on said cage, having an inclined riser, a bolt member engaged by said latch and movable by said riser to transmit longitudinal movement to said supporting frame and move said supporting frame to said other end of its travel, said bolt having an annular gripping ledge, catches tending to grip said ledge and disposed in position facing one another, and means intrudable between said catches to spread the latter and release said bolt.

4. An instrument for determining the direction of holes, comprising a cage, a compass having a normally free needle to indicate orientation, locking means to hold said needle in position, a supporting frame mounted for limited longitudinal travel in said cage, resilient means tending to hold said frame at one end of its travel, an elongated pendulous body supported in said supporting frame and normally free at one end, an abutment in said cage for the free end of said body and arranged to be normally free of and to be engaged by the free end of said body upon movement of said supporting frame to the other end of its travel and engagement of said body with said abutment and thereby to hold said pendulous body in indicating position, a connection between said abutment and said locking means to actuate the latter and to hold said needle in indicating position when said supporting frame is held in indicating position; mechanism for moving said frame to the other end of its travel including a laterally slidable latch on said cage, having an inclined riser, a bolt member engaged by said latch and movable by said riser to transmit longitudinal movement to said supporting frame and move said supporting frame to said other end of its travel, said bolt having an annular gripping ledge, upstanding catches disposed in position facing one another, resilient means tending to move said catches toward one another and to grip said ledge to hold said bolt out of engagement with said riser, a sliding actuating pin intrudable between said catches to spread the latter and release said bolt, said actuating pin having an annular gripping ledge, a set of catches for said last named gripping ledge, and means intrudable between said last named catches to release said actuating pin.

5. In a string of drill pipe an instrument for determining the direction of holes, comprising a cage, a compass having a normally free needle to indicate orientation, locking means to hold said needle in position, a supporting frame mounted for limited longitudinal travel in said cage, resilient means tending to hold said frame at one end of its travel, an elongated pendulous body supported in said supporting frame and normally free at one end, an abutment in said cage for the free end of said body and arranged to be normally free of and to be engaged by the free end of said body upon movement of said supporting frame to the other end of its travel and engagement of said body with said abutment and thereby to hold said pendulous body in indicating position, a connection between said abutment and said locking means to actuate the latter and to hold said needle in indicating position when said supporting frame is held in indicating position; mechanism for moving said frame to the other end of its travel including a laterally slidable latch on said cage, having an inclined riser, a bolt member engaged by said latch and movable by said riser to transmit longitudinal movement to said supporting frame and move said supporting frame to said other end of its travel, said bolt having an annular gripping ledge, upstanding catches disposed in position facing one another, resilient means tending to hold said catches in gripping relation to said ledge and hold said bolt out of engagement with said riser, a slidable actuating pin intrudable between said catches to spread the latter and release said bolt, said actuating pin having an annular gripping ledge, a set of catches for said last named gripping ledge, a ball free to be moved through the circulation passage of said drill pipe upon said last named catches to spread the latter and release said actuating pin, said actuating pin and bolt being alined to be engaged by one another and be moved by impact of said ball with said actuating pin.

6. In a string of drill pipe an instrument for determining the direction of holes, comprising a cage, a compass having a normally free needle to indicate orientation, locking means to hold said needle in position, a supporting frame mounted for limited longitudinal travel in said cage, resilient means tending to hold said frame at one end of its travel, an elongated pendulous body supported in said supporting frame and normally free at one end, an abutment in said cage for the free end of said body and arranged to be normally free of and to be engaged by the free end of said body upon movement of said supporting frame to the other end of its travel and engagement of said body with said abutment and thereby to hold said pendulous body in indicating position, a connection between said abutment and said locking means to actuate the latter and to hold said needle in indicating position when said supporting frame is held in indicating position; mechanism for moving said frame to the other end of its travel including a laterally slidable latch on said cage, having an inclined riser, a bolt member engaged by said latch and movable by said riser to transmit longitudinal movement to said supporting frame and move said supporting frame to said other end of its travel, said bolt having an annular gripping ledge, upstanding catches disposed in position facing one another, resilient means tending to hold said catches in gripping relation to said ledge and hold said bolt out of engagement with said riser, a slidable actuating pin intrudable between said catches to spread the latter and release said bolt, said actuating pin having an annular gripping ledge, a set of catches for said last named gripping ledge, resilient means tending to hold the members of said set in gripping relation to said last named ledge, a barrel alined with said set of catches, a ball movable through said barrel and acting as a plunger therein, said ball being free to be dropped into the circulation passage of said drill pipe and to enter said barrel whereby to be projected between the last named catches and spread the latter to release said actuating pin, said actuating pin and bolt being alined to be engaged by one another and be moved by impact of said ball with said actuating pin.

7. In a drill pipe string an instrument for determining the direction of holes, comprising a cage, a compass having a normally free needle to indicate orientation, locking means to hold said needle in position, a supporting frame mounted for limited longitudinal travel in said cage, resilient means tending to hold said frame at one end of its travel, an elongated pendulous body supporting in said supporting frame and normally free at one end, an abutment in said cage for the free end of said body and arranged to be normally free of and to be engaged by the free end of said body upon movement of said supporting frame to the other end of its travel and engagement of said body with said abutment and thereby to hold said pendulous body in indicating position, a connection between said abutment and said locking means to actuate the latter and to hold said needle in indicating position when said supporting frame is held in indicating position; mechanism for moving said frame to the other end of its travel including a laterally slidable latch on said cage, having an inclined riser, a bolt member engaged by said latch and movable by said riser to transmit longitudinal movement to said supporting frame and move said supporting frame to said other end of its travel, a ball free to be dropped through the circulation passage of said drill pipe string, and means to transmit impulse of said ball to said bolt.

In witness that I claim the foregoing I have hereunto subscribed my name this 11th day of April, 1929.

CLAY G. WOODMANSEE.